US007050459B2

(12) United States Patent
Kandala (10) Patent No.: US 7,050,459 B2
(45) Date of Patent: May 23, 2006

(54) DEVICES, METHODS AND SOFTWARE FOR CENTRALIZED SESSION PLANNING WHILE IN A DCF MODE

(75) Inventor: Srinivas Kandala, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 885 days.

(21) Appl. No.: 09/823,407

(22) Filed: Mar. 30, 2001

(65) Prior Publication Data

US 2002/0143970 A1 Oct. 3, 2002

Related U.S. Application Data

(60) Provisional application No. 60/233,122, filed on Sep. 18, 2000.

(51) Int. Cl.
*H04J 3/22* (2006.01)
*H04J 3/16* (2006.01)

(52) U.S. Cl. .................. 370/469; 370/346; 370/449

(58) Field of Classification Search ................ 370/465, 370/468, 469, 477, 449, 442, 443, 447, 395.2, 370/329, 338, 347, 229, 230, 346
See application file for complete search history.

(56) References Cited

U.S. PATENT DOCUMENTS 5,297,144 A * 3/1994 Gilbert et al. ............... 370/346
5,677,909 A * 10/1997 Heide ......................... 370/347
5,724,168 A * 3/1998 Oschmann et al. .......... 398/127
5,903,373 A * 5/1999 Welch et al. ................ 398/128
6,067,291 A * 5/2000 Kamerman et al. ......... 370/338
6,574,266 B1 * 6/2003 Haartsen ..................... 375/133
6,804,222 B1 * 10/2004 Lin et al. .................... 370/338

OTHER PUBLICATIONS

"IEEE standard Part II: wireless LAN medium access control (MAC) and physical layer (PHY) specification. (ISO/IEC 8802-11, ANSI/IEEE Std 802.11-1999) Chapter 9: MAC sublayer functional description", ISO/IEC 8802-11 ANSI/IEEE STD 802.11, Aug. 20, 1999, pp. 70-97, XP002207974, * paragraphs '09.1!, '09.2!, '09.3! *.

Natarajan K S: "A hybrid medium access control protocol for wireless LANs" Wireless Communications, 1992. Conference Proceedings., 1992 IEEE International Conference on Selected Topics in Vancouver, BC, Canada Jun. 25-26, 1992, New York, NY, USA, IEEE, US, Jun. 25, 1992, pp. 134-137, XP010065399, ISBN: 0-7803-0723-2, * paragraph '00021!*.

(Continued)

*Primary Examiner*—Brian Nguyen
(74) *Attorney, Agent, or Firm*—Marger Johnson & McCollom, P.C.

(57) ABSTRACT

Devices, softwares and methods for centralized session planning while in a DCF mode. An access point plans centrally a schedule of individual sessions with each station. Then it announces to each peripheral station the onset of the session by a polling pulse that includes the return address of a MAC layer of the station. The addressed peripheral device then transmits data from its MAC layer.

24 Claims, 5 Drawing Sheets

OTHER PUBLICATIONS

European Search Report, Application No. EP 01 12 1579.
*Information Technology—Telecommunications and Information Exchange Between Syste m s—Local and Metropolitan Area Networks—Specific Requirements: Part 11: Wireless LAN Medium Access Control (MAC) and Physical Layer (PHY) Specifications*, IEEE Std. 802.11, 1999 Edition.

Ayyagari A., et al, *IEEE 802.11 Quality of Service—White Paper*, IEEE 802.11 document No. 00/028, Feb. 2000. A description of prior art mechanism.

Banchs A., et al., *Wireless MAC Multimedia Extensions*, IEEE 802.11 document No. 00/205, Jul. 2000. A description of prior art mechanism.

* cited by examiner

DEVICES, METHODS AND SOFTWARE FOR CENTRALIZED SESSION PLANNING WHILE IN A DCF MODE

CROSS REFERENCE TO RELATED APPLICATIONS

This application claims priority from U.S. Provisional Application No. 60/233,122, filed on Sep. 18, 2000, which is hereby incorporated by reference.

BACKGROUND OF THE INVENTION

1. Field of the Invention

The present invention is related to the field of wireless communication, and more specifically to devices, methods and software for centralized wireless communication session planning while in a DCF mode.

2. Description of the Related Art

Local area networks (LANs) are increasingly used to transfer data. A relatively new application is wireless LANs, also known as WLANs. These can provide the benefits of a wired LAN, without requiring the different stations to be physically coupled to each other. There is no need for procuring transmission wires such as coaxial conductors, twisted prayers of wires, optical fibers, etc. for transferring the data. Instead, the data is transferred through space, either using radio frequency (RF) waves (which are also known as microwaves), or optical frequency waves, such as infrared (IR) light. A network may be formed by bringing components close together, without the need to plug transmission wires to them.

Radio based WLANs have several characteristics which differ from those of wired LANs. These-characteristics include lower achievable data capacity, which is due to a number of factors. These factors include bandwidth and power limitations, higher error rates, and a communication capacity that changes with time and may depend on the particular source and destination of the transmission. The latter may be due to interfering signals.

A number of characteristics remain the same. One of them is the predominant software architecture for implementing communication. WLANs may use a multilayer communication protocol stack such as the standard open systems interconnection (OSI) management compatible architecture, which is also used for the internet. Much of this architecture is documented in literature produced by the Internet Engineering Task Force (IETF).

A difficulty arises when wireless communication devices first attempt to establish a network. A number of peripheral station devices may want to exchange data with a single access point. The stations issue reservation requests, to reserve a session for exchanging data. These reservation requests may be conflicting, if they are for the same time. There is a need to resolve conflicting requests.

BRIEF SUMMARY OF THE INVENTION

The present invention overcomes these problems and limitations of the prior art.

Generally, the present invention provides devices, softwares and methods for centralized session planning while in a DCF mode. An access point made according to the invention plans centrally a schedule of individual sessions with each station. The access point then announces to each peripheral station the onset of the session, by a polling pulse that includes the return address of a MAC layer of the station. The addressed peripheral device then transmits data from its MAC layer.

An advantage of the invention is that it alleviates the load during the PCF mode, which can be very high. Moreover, it permits centralized administration of admission control, even when the optional PPCF mode is not implemented at all.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for centralized wireless communication session planning while in a DCF mode.

Unless stated otherwise the terms in this document are to be interpreted consistently with the definitions of the IETF and the institute of Electrical and Electronics Engineers (IEEE). IETF and IEEE maintain websites where the standards may be researched. For the benefit of the reader, a list of the most useful acronyms is given below.

Figure 1:
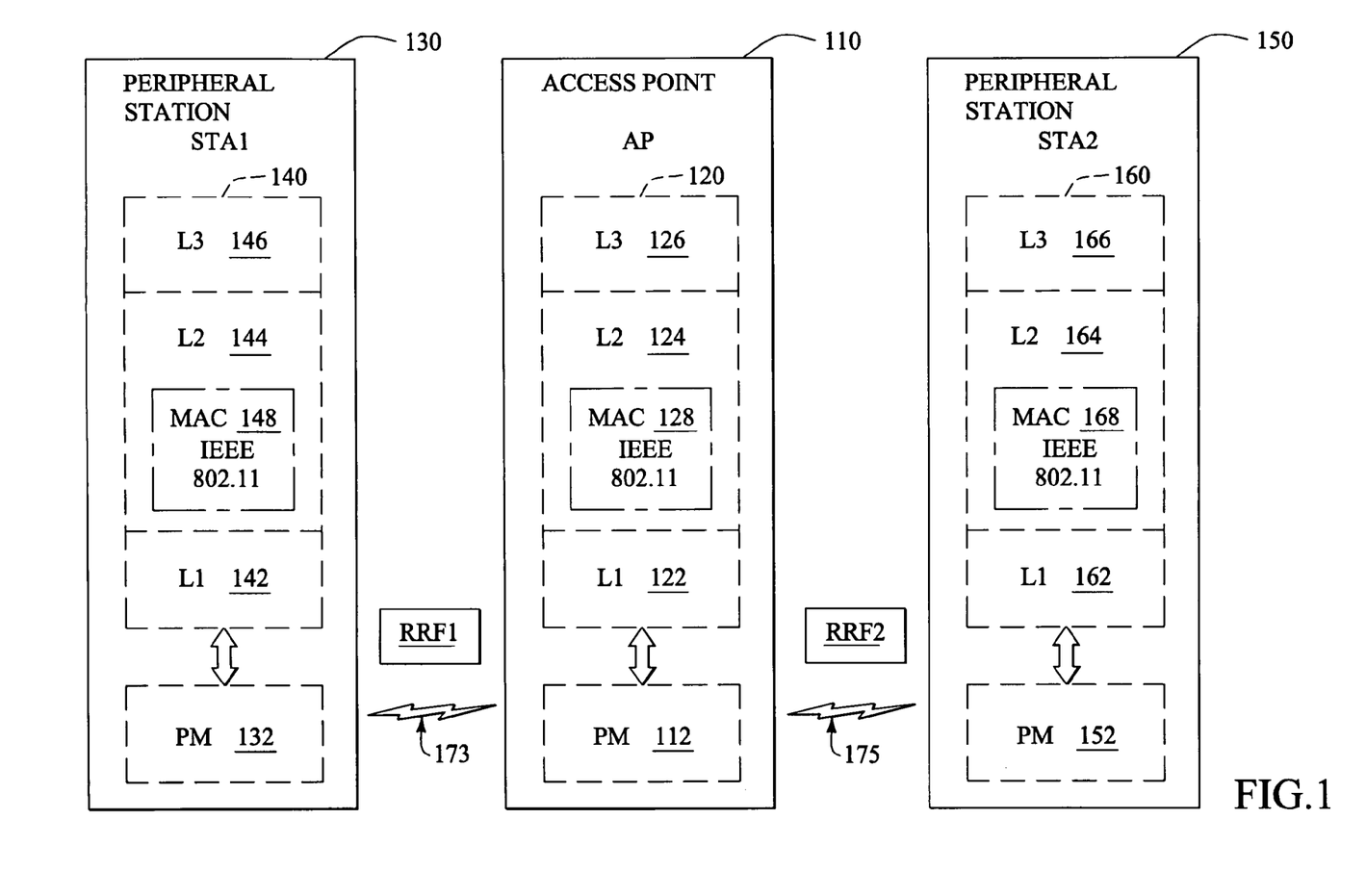
FIG. 1 is a diagram illustrating architectures of a wireless access point and a wireless base station made according to embodiments of the invention.

AP—Access Point
CCI—Centralized Contention Interval
CTS—Clear To Send
DCF—Distribution Coordination Function
MAC—Medium Access Control
PM—Physical Medium
RA—Return Address
RR—Reservation Request
RRF—Reservation Request Frame
SIFS—Short Inter-Frame Spacing
STA—Station Referring to FIG. 1, an Access Point (AP) device 110 includes a physical medium 112. Physical medium 112 may include a transmitting antenna, a receiving antenna, etc.

AP 110 also includes a software structure 120 that includes a number of layers prescribed by OSI. These layers include a layer L1 122 which is also called a physical layer 122, and is for controlling physical medium 112. A layer L2 124 is on top of layer L1 122. And a layer L3 126 is on top of layer L2 124, and is also called network layer 126. Other layers (not shown in FIG. 1) may also be present.

Layer L2 124 includes a medium access control (MAC) sublayer 128. MAC sublayer 128 is made according to the relevant specifications of IEEE 802.11 standard. MAC sublayer 128 is capable of operating in the DCF mode, and optionally also in the PCF mode.

Continuing to refer to FIG. 1, a first peripheral station STA1 130 includes a physical medium 132. Physical medium 132 may include a transmitting antenna, a receiving antenna, etc.

Station STA1 130 also includes a software structure 140 that includes a number of layers prescribed by OSI. These layers include a layer L1 142 which is also called a physical layer 142, and is for controlling physical medium 132. A layer L2 144 is on top of layer L1 142. And a layer L3 146 is on top of layer L2 144, and is also called network layer 146. Other layers (not shown in FIG. 1) may also be present.

Layer L2 144 includes a medium access control (MAC) sublayer 148. MAC sublayer 148 is made according to the relevant specifications of IEEE 802.11 standard. MAC sublayer 148 is capable of operating in the DCF mode, and optionally also in the PCF mode.

Continuing to refer to FIG. 1, a first peripheral station STA2 150 includes a physical medium 152. Physical medium 152 may include a transmitting antenna, a receiving antenna, etc.

Station STA2 150 also includes a software structure 160 that includes a number of layers prescribed by OSI. These layers include a layer L1 162 which is also called a physical layer 162, and is for controlling physical medium 152. A layer L2 164 is on top of layer L1 162. And a layer L3 166 is on top of layer L2 164, and is also called network layer 166. Other layers (not shown in FIG. 1) may also be present.

Layer L2 164 includes a medium access control (MAC) sublayer 168. MAC sublayer 168 is made according to the relevant specifications of IEEE 802.11 standard. MAC sublayer 168 is capable of operating in the DCF mode, and optionally also in the PCF mode.

Software structures 120, 140, 160 may be implemented in any way known in the art. One convenient way is with Digital Signal Processing.

Devices AP 110, STA1 130 and STA2 150 may form a WLAN. This will be accomplished by wireless communication of their respective physical media 112, 132, 152.

More particularly, physical medium 132 may establish a connection 173 with physical medium 112, through which to transmit a first reservation request frame RRF1 during a Centralized Contention Interval (CCI). Additionally, physical medium 152 may establish a connection 175 with physical medium 112, through which to transmit a second reservation request frame RRF2, during the same CCI.

Figure 2:
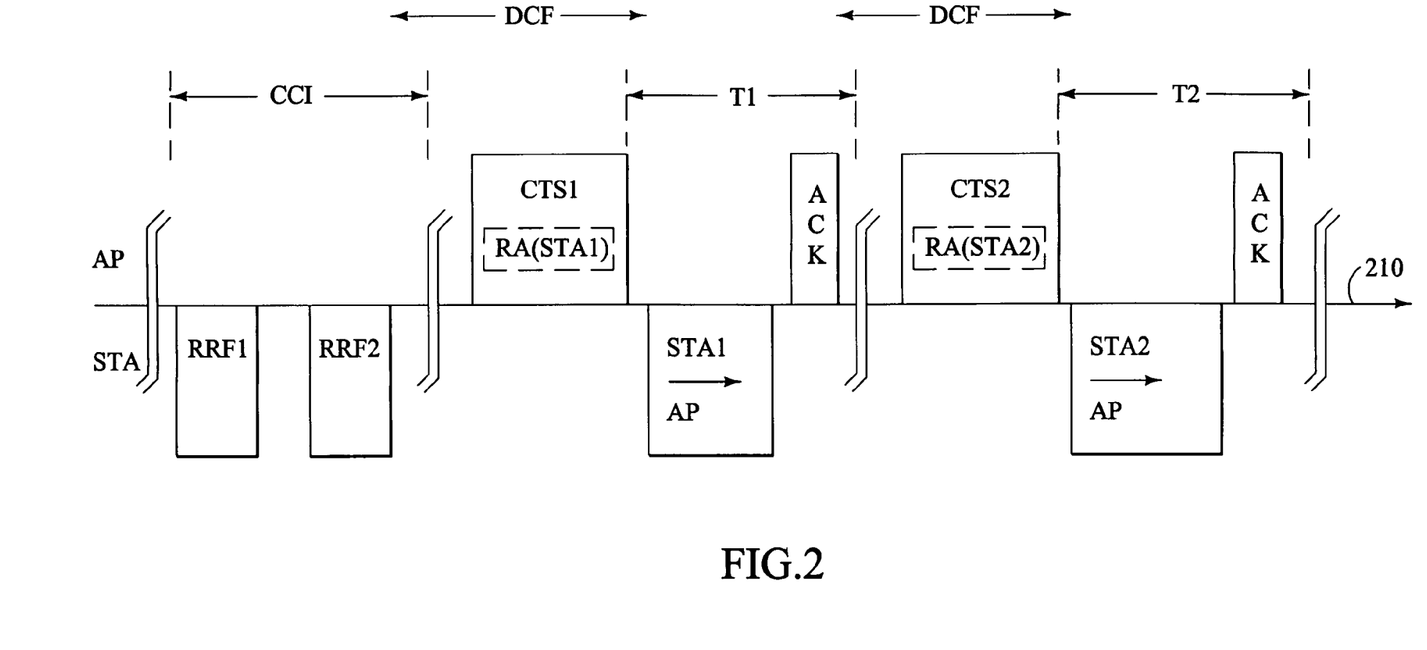
FIG. 2 is a time diagram of a signal exchange between the access point and the base station of FIG. 1 according to an embodiment of the invention.

Referring now to FIG. 2, an exchange of pulses according to the invention is described in more detail with reference to a time axis 210.

Reservation request frames RRF1, RRF2 are received within the CCI.

Then AP 110 processes RRF1, RRF2 while in the DCF mode by extracting a reservation request from each of the reservation request frames. Then AP 110 schedules sessions of duration T1, T2 for exchanging data with each of devices STA1 130, STA2 150.

Then AP 110 acquires control of the wireless communication channel. It does this by claiming higher priority over other peripheral stations.

Then AP 110 announces the schedule by sending polling pulses CTS1, CTS2 through the channel. Polling pulses CTS1, CTS2 may be any polling pulses, but are preferably "Clear to Send" pulses, as defined in the IEEE 802.11 standard. They are sent while in DCF mode.

Polling pulse CTS1 is for device STA1 130, and includes an encoded field of a return address RA(STA1) of a MAC sublayer 148. Upon receiving polling pulse CTS1, STA1 130 identifies the return address RA(STA1) of its own MAC sublayer 148, and therefore proceeds to exchange data with AP 110. Preferably it starts exchanging data within SIFS. The exchange lasts for a time duration T1. Advantageously, time duration TI may also have been encoded in polling pulse CTS1, for decoding by device STA1 130.

Similarly, polling pulse CTS2 is for device STA2 150, and includes an encoded field of a return address RA(STA2) of a MAC sublayer 168. Upon receiving polling pulse CTS2, STA2 150 identifies the return address RA(STA2) of its own MAC sublayer 168, and therefore proceeds to exchange data with AP 110. Preferably it starts exchanging data within SIFS. The exchange lasts for a time duration T2. Advantageously, time duration T2 may also have been encoded in polling pulse CTS2, for decoding by device STA2 150.

It is readily apparent that the present invention may be implemented by one or more devices that include logic circuitry. It may also be implemented by a device that includes a dedicated processor system, which may include a microcontroller or a microprocessor. Examples of such alternate embodiments are seen below.

Figure 3:
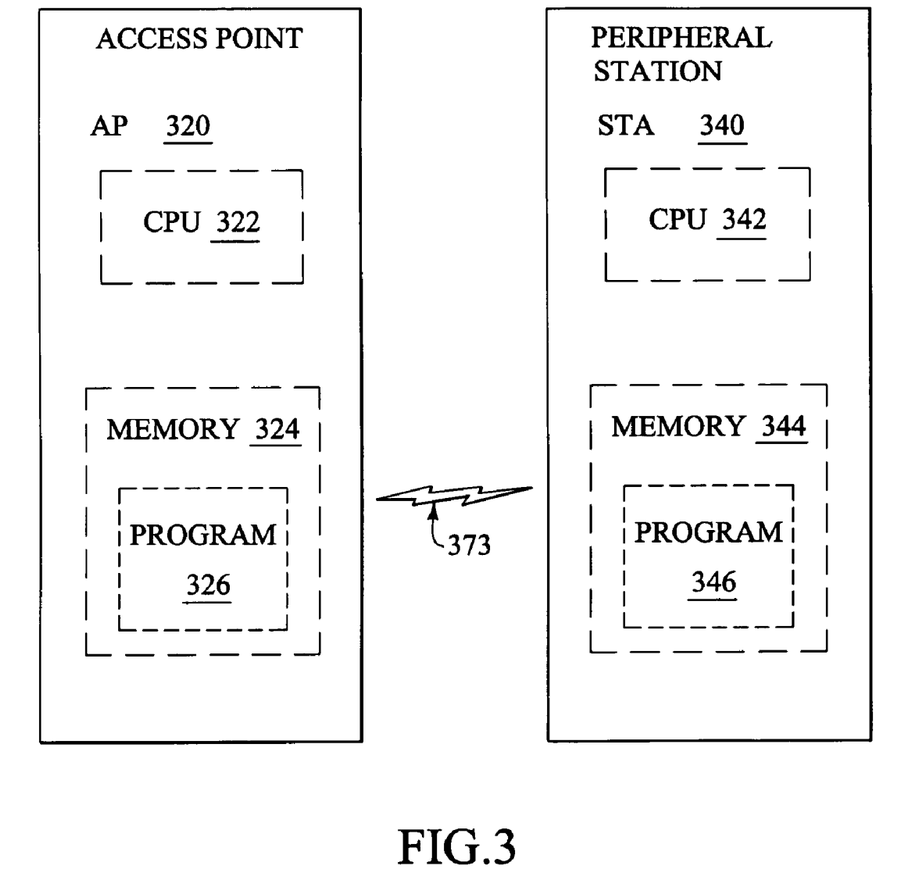
FIG. 3 is a diagram illustrating architectures of a wireless access point and a wireless base station made according to other embodiments of the invention.

Referring now to FIG. 3, an Access Point AP 320 made according to an embodiment of the invention is described in more detail. AP 320 may be any communication device, such as a wireless communication device (a station, a peripheral, etc.)

Access Point AP 320 has a processor 322, which may be implemented as a Digital Signal Processor (DSP), Central Processing Unit (CPU), or any other equivalent way known in the art.

Access Point AP 320 additionally includes a memory 324, on which a program 326 may reside. Functions of processor 322 may be controlled by program 326, as will become apparent from the below.

Continuing to refer to FIG. 3, a peripheral station STA3 340 made according to an embodiment of the invention is described in more detail. Station STA3 340 may be any communication device, such as a wireless communication device (a station, a peripheral, etc.)

Station STA3 340 has a processor 342, which may be implemented as a Digital Signal Processor (DSP), Central Processing Unit (CPU), or any other equivalent way known in the art.

Station STA3 340 additionally includes a memory 344, on which a program 346 may reside. Functions of processor 342 may be controlled by program 346, as will become apparent from the below.

Access Point AP 320 may establish a communication connection link 373 with station STA3 340.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 4:
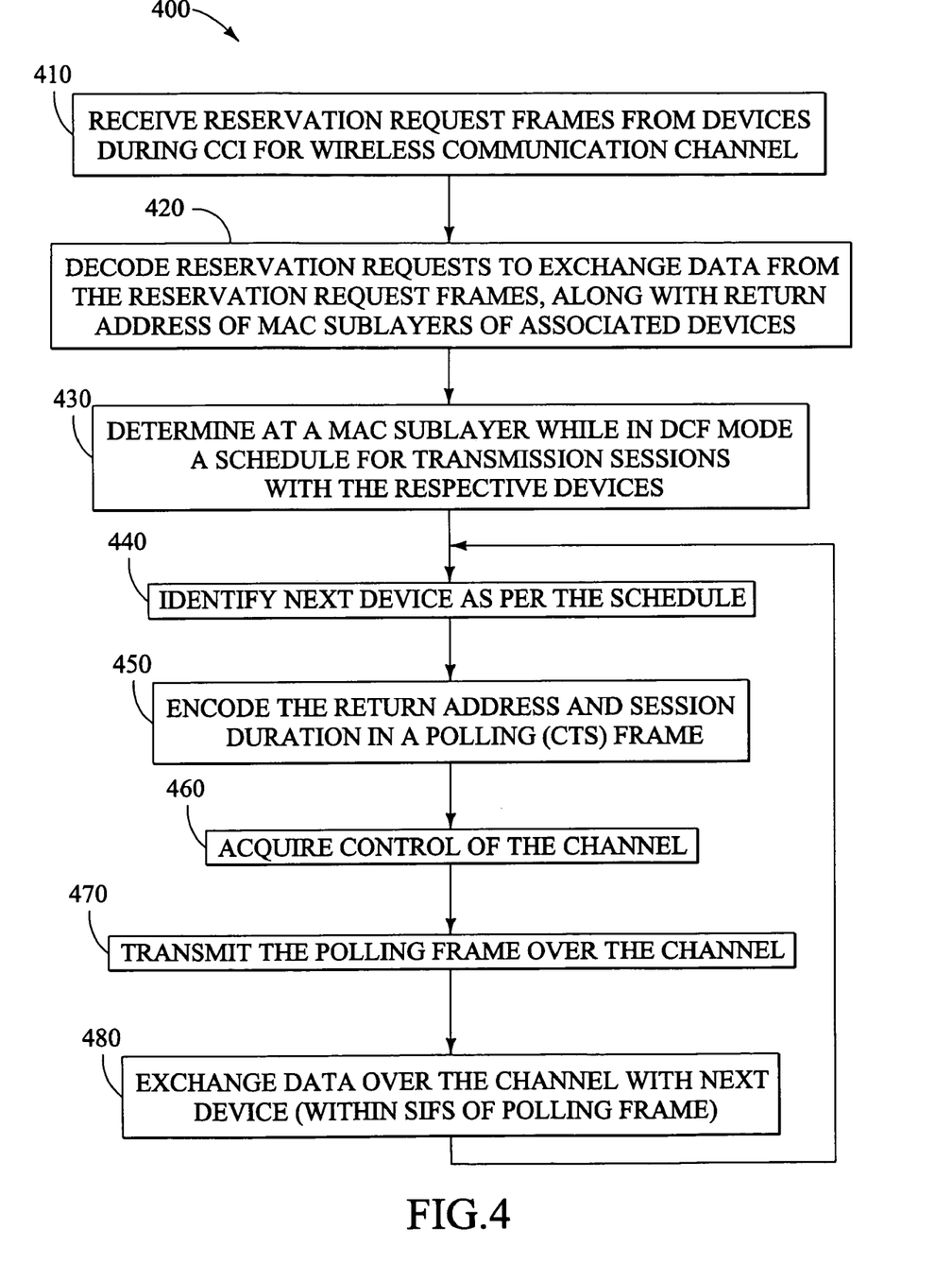
FIG. 4 is a flowchart illustrating a method according to an embodiment of the present invention.

Referring now to FIG. 4, a flowchart 400 is used to illustrate a method according to an embodiment of the invention. The method of flowchart 400 may be practiced by an access point device in a WLAN.

According to a box 410, reservation request frames are received from devices during CCI for a wireless communication channel.

According to a next box 420, reservation requests are decoded from the reservation request frames. The reservation requests are for exchanging data. Additionally, return addresses of MAC sublayers of the associated devices are also decoded.

According to a next box 430, a schedule is determined for transmission sessions with the respective devices. The schedule is optionally determined at a MAC sublayer while in DCF mode.

According to an optional next box 440, a next device is identified, as per the schedule.

According to a next box 450, a polling frame is prepared. In the preferred form, it is a CTS frame. The return address and session duration are encoded in the polling frame.

According to a next box 460, control of the channel is acquired.

According to a next box 470, the polling frame is transmitted over the channel.

According to a next box 480, data is exchanged over the channel with the next device. Preferably the exchange starts within SIFS of the polling frame.

Execution then returns to box 440, to identify the next device scheduled to have a session.

Figure 5:
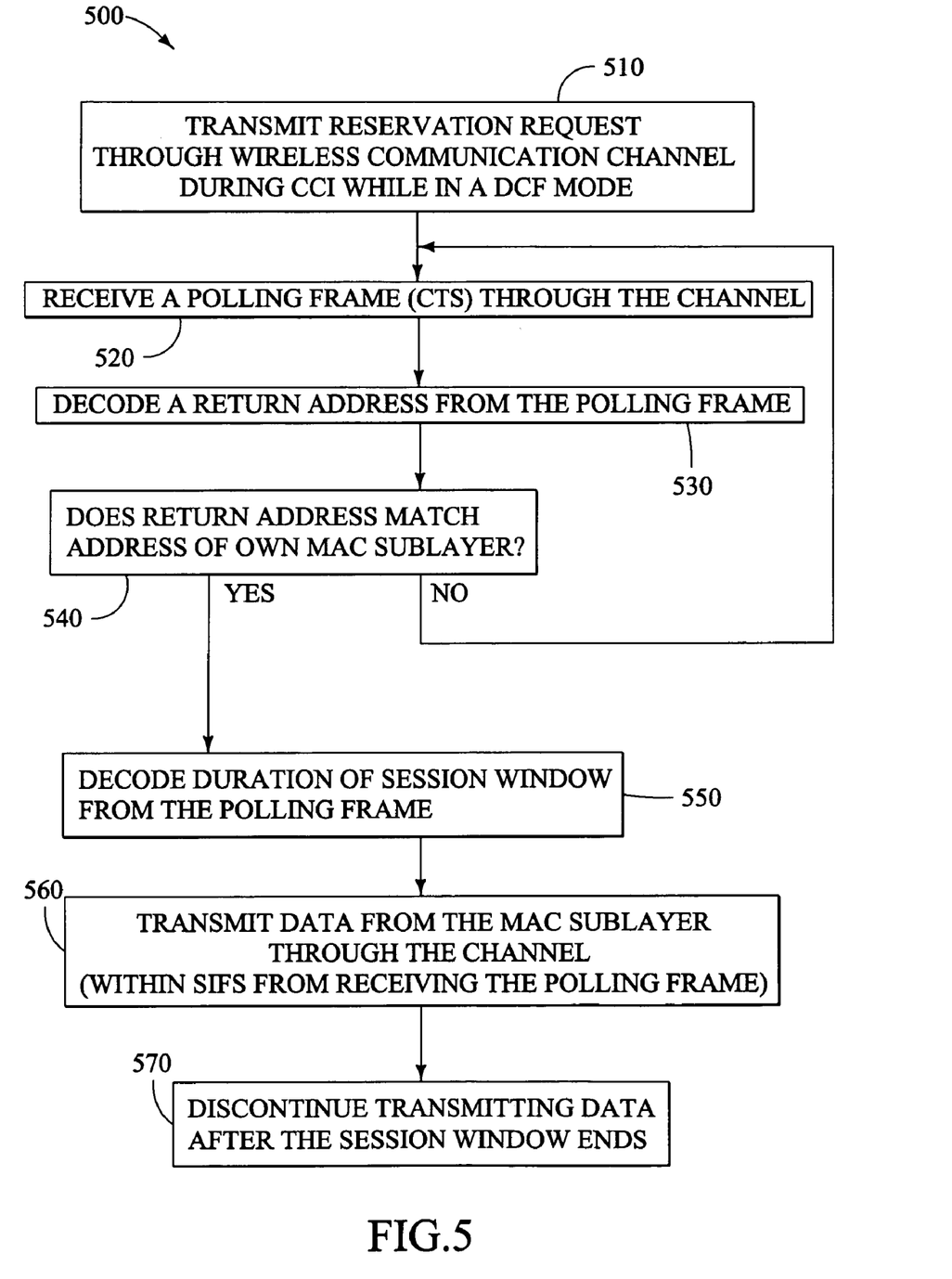
FIG. 5 is a flowchart illustrating a method according to another embodiment of the present invention.

Referring now to FIG. 5, a flowchart 500 is used to illustrate a method according to another embodiment of the invention. The method of flowchart 500 may be practiced by a peripheral station.

According to a box 510, reservation request is transmitted through a wireless communication channel. The reservation request is transmitted in a RRF during CCI while in a DCF mode.

According to an optional next box 520, a polling frame is received through the channel. The polling frame may be by convention a CTS frame.

According to a next box 530, a return address is decoded from the polling frame.

According to a next box 540, it is inquired whether the return address matches the address of the device's own MAC sublayer. If not, then execution returns to box 520. A new polling pulse is awaited.

If yes, then according to an optional next box 550, a duration of a session window is decoded from the polling frame. This does not take place if one is not provided.

According to a next box 560, data is transmitted from the MAC sublayer through the channel. Preferably the transmission starts within SIFS from receiving the polling frame.

According to an optional next box 570, if a duration of the session is known, transmitting of data is discontinued after the session window ends.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A communication device comprising:
a physical medium; and
a processor coupled with the physical medium, the processor:
receiving a plurality of reservation request frames from a plurality of respective devices during a Centralized Contention Interval for a wireless communication channel, each reservation request frame including a return address;
decoding a reservation request and the return address from each reservation request frame;
determining at a Medium Access Control (MAC) sublayer based on the return addresses a schedule of transmission sessions for exchanging data with the respective devices as per the respective reservation requests;
identifying one of the respective devices from the schedule as being a first one to reserve the channel;
encoding the return address and a duration of a session window of the identified first device in a polling frame;
acquiring control of the channel;
transmitting the polling frame over the channel while in a Distribution Coordination Function (DCF) mode; and
exchanging data over the channel from the identified first device during the respective session.

2. The device of claim 1, the processor further:
identifying another one of the respective devices from the schedule as being the next one;
encoding the return address of the next device in a next polling frame;
acquiring control of the channel;
transmitting the next polling frame over the channel while in a Distribution Coordination Function (DCF) mode; and
exchanging data over the channel from the identified next device during the respective session.

3. The device of claim 1, wherein
receiving the data is to be within a Shot Inter-Frame Spacing (SIFS) of transmitting the polling frame.

4. The device of claim 1, wherein
the polling frame is a Clear To Send (CTS) frame.

5. A communication device comprising:
a physical medium; and
a processor coupled with the physical medium, the processor:
transmitting a reservation request through a wireless communication channel during a Centralized Contention Interval;
receiving a polling frame through the channel while in a Distribution Coordination Function (DCF) mode, the polling frame including a return address and a duration of a session window;
decoding the return address and the duration of the session window from the polling frame;
determining whether the return address from the polling frame matches an address of a Medium Access Control (MAC) sublayer of the device; and
if so, transmitting data from the MAC sublayer through the channel.

6. The device of claim 5, the processor further:
discontinuing transmitting data after the session window ends.

7. The device of claim 5, wherein
transmitting the data from the MAC sublayer is to be performed within a Shot Inter-Frame Spacing (SIFS) from receiving the polling frame.

8. The device of claim 5, wherein
the polling frame is a Clear To Send (CTS) frame.

9. An article comprising: a storage medium, said storage medium having stored thereon instructions, that, when executed by at least one device, result in:
receiving a plurality of reservation request frames from a plurality of respective devices during a Centralized Contention Interval for a wireless communication channel, each reservation request frame including a return address;
decoding a reservation request and the return address from each reservation request frame;
determining at a Medium Access Control (MAC) sublayer based on the return addresses a schedule of transmission sessions for exchanging data with the respective devices as per the respective reservation requests;
identifying one of the respective devices from the schedule as being a first one to reserve the channel;
encoding the return address and a duration of a session window of the identified first device in a polling frame;
acquiring control of the channel;
transmitting the polling frame over the channel while in a Distribution Coordination Function (DCF) mode; and
exchanging data over the channel from the identified first device during the respective session.

10. The article of claim 9, wherein the instructions further result in:
identifying another one of the respective devices from the schedule as being the next one;
encoding the return address of the next device in a next polling frame;
acquiring control of the channel;
transmitting the next polling frame over the channel while in a Distribution Coordination Function (DCF) mode; and
exchanging data over the channel from the identified next device during the respective session.

11. The article of claim 9, wherein
receiving the data is within a Shot Inter-Frame Spacing (SIFS) of transmitting the polling frame.

12. The article of claim 9, wherein
the polling frame is a Clear To Send (CTS) frame.

13. An article comprising: a storage medium, said storage medium having stored thereon instructions, that, when executed by at least one device, result in:
transmitting a reservation request through a wireless communication channel during a Centralized Contention Interval;
receiving a polling frame through the channel while in a Distribution Coordination Function (DCF) mode, the polling frame including a return address and a duration of a session window;

decoding the return address and the duration of the session window from the polling frame;

determining whether the return address matches an address of a Medium Access Control (MAC) sublayer of the device; and if so, transmitting data from the MAC sublayer through the channel.

14. The article of claim 13, wherein the instructions further result in:

discontinuing transmitting data after the session window ends.

15. The article of claim 13, wherein transmitting the data from the MAC sublayer is performed within a Shot Inter-Frame Spacing (SIFS) from receiving the polling frame.

16. The article of claim 13, wherein the polling frame is a Clear To Send (CTS) frame.

17. A method comprising:

receiving a plurality of reservation request frames from a plurality of respective devices during a Centralized Contention Interval for a wireless communication channel, each reservation request frame including a return address;

decoding a reservation request and the return address from each reservation request frame;

determining at a Medium Access Control (MAC) sublayer based on the return addresses a schedule of transmission sessions for exchanging data with the respective devices as per the respective reservation requests;

identifying one of the respective devices from the schedule as being a first one to reserve the channel;

encoding the return address and a duration of a session window of the identified first device in a polling frame;

acquiring control of the channel;

transmitting the polling frame over the channel while in a Distribution Coordination Function (DCF) mode; and exchanging data over the channel from the identified first device during the respective session.

18. The method of claim 17, further comprising:

identifying another one of the respective devices from the schedule as being the next one;

encoding the return address of the identified next device in a next polling frame;

acquiring control of the channel;

transmitting the next polling frame over the channel while in a Distribution Coordination Function (DCF) mode; and exchanging data over the channel from the identified next device during the respective session.

19. The method of claim 17, wherein receiving the data is within a Shot Inter-Frame Spacing (SIFS) of transmitting the polling frame.

20. The method of claim 17, wherein the polling frame is a Clear To Send (CTS) frame.

21. A method comprising:

Transmitting, by a communication device, a reservation request through a wireless communication channel during a Centralized Contention Interval;

receiving a polling frame through the channel while in a Distribution Coordination Function (DCF) mode, the polling frame including a return address and a duration of a session window;

decoding the return address and the duration of the session window from the polling frame;

determining whether the return address matches an address of a Medium Access Control (MAC) sublayer of the device; and if so, transmitting data from the MAC sublayer through the channel.

22. The method of claim 21, further comprising:

decoding a duration of a session window from the polling frame; and discontinuing transmitting data after the session window ends.

23. The method of claim 21, wherein transmitting the data from the MAC sublayer is performed within a Shot Inter-Frame Spacing (SIFS) from receiving the polling frame.

24. The method of claim 21, wherein the polling frame is a Clear To Send (CTS) frame.

* * * * *